United States Patent
Carson et al.

(10) Patent No.: US 6,592,983 B1
(45) Date of Patent: *Jul. 15, 2003

(54) ABSORBENT SHEET MATERIAL HAVING CUT-RESISTANT PARTICLES AND METHODS FOR MAKING THE SAME

(75) Inventors: John Kit Carson, Liberty Township, OH (US); Steven Michael Schennum, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/560,068

(22) Filed: Apr. 27, 2000

Related U.S. Application Data (63) Continuation-in-part of application No. 09/336,494, filed on Jun. 18, 1999, now Pat. No. 6,391,806.

(51) Int. Cl.[7] .......................... B32B 19/02; B32B 23/18; B32B 11/02; B29C 47/78
(52) U.S. Cl. .................. 428/323; 428/326; 428/327; 428/340; 428/409; 264/122; 264/125
(58) Field of Search .................. 428/323, 326, 428/327, 911, 304.4, 310.5, 340, 537.5, 407; D7/698; 269/289 R; 604/367, 372, 374; 264/122, 125

(56) References Cited

U.S. PATENT DOCUMENTS

| | | | |
|---|---|---|---|
| 2,962,414 A | 11/1960 | Araledter | 162/145 |
| 2,962,415 A | 11/1960 | Arledter | 162/145 |
| 3,184,373 A | 5/1965 | Arledter | 162/152 |
| 3,325,345 A | * 6/1967 | Hider et al. | 162/169 |
| 3,937,648 A | 2/1976 | Huebner et al. | 162/168 |
| 4,225,383 A | 9/1980 | McReynolds | 162/156 |
| 4,311,479 A | 1/1982 | Fenn et al. | 8/495 |
| 4,328,275 A | 5/1982 | Vargo | 428/156 |
| 4,379,808 A | 4/1983 | Cole et al. | 428/438 |
| 4,614,679 A | 9/1986 | Farrington, Jr. et al. | 428/138 |
| 4,619,734 A | * 10/1986 | Andersson | 162/111 |
| 4,769,109 A | 9/1988 | Tellvik et al. | 162/123 |
| 4,769,274 A | 9/1988 | Tellvik et al. | 428/218 |
| 4,865,855 A | 9/1989 | Hansen et al. | 426/124 |
| 4,878,765 A | 11/1989 | Watkins et al. | 383/116 |
| 4,957,805 A | 9/1990 | Biggs et al. | 428/223 |
| 5,093,164 A | 3/1992 | Bauer et al. | 428/35.4 |
| 5,215,627 A | 6/1993 | Willis et al. | 162/156 |

(List continued on next page.)

FOREIGN PATENT DOCUMENTS

| | | | |
|---|---|---|---|
| EP | WO99/18156 | * | 4/1999 |
| WO | WO 99/18156 | | 4/1999 |

Primary Examiner—Paul Thibodeau
Assistant Examiner—Nikolas J. Uhlir
(74) Attorney, Agent, or Firm—Peter D. Meyer (57) ABSTRACT

A cut-resistant and shred-resistant absorbent sheet material including an absorbent substrate and cut-resistant particles distributed through the substrate. Preferably, the absorbent substrate comprises cellulosic material and the particles comprise polymeric materials having an average size of at least about 100 micrometers, and most preferably between 100 and 1000 micrometers. It is also preferred that the absorbent substrate is provided in an amount of at least 50 percent by weight and is substantially free of inorganic free filler particulate. In addition, it is preferred that the sheet material has a basis weight of at least 100 pounds per 3000 ft$^2$, and that the particles are provided in an amount of between about 10 percent and about 50 percent by weight of the sheet. The sheet material can be made using typical paper making processes. Preferably, heat and/or pressure are applied to the sheet material to cause the particles to at least partially flow, so as to bond to the absorbent substrate. It is also preferred that the sheet material exhibit an absorbent efficiency of at least 0.2, a cut-resistance at least 30 kgf/cm, a wet abrasion loss of less than about 400 mg/100 revolutions, and a dry abrasion loss of less than about 300 mg/100 revolutions.

38 Claims, 6 Drawing Sheets

U.S. PATENT DOCUMENTS

| | | | |
|---|---|---|---|
| 5,338,406 A | 8/1994 | Smith | 162/168.2 |
| 5,414,248 A | 5/1995 | Phillips | 219/730 |
| 5,480,693 A | 1/1996 | Patterson et al. | 428/36.7 |
| 5,501,886 A | 3/1996 | Hammer et al. | 428/34.8 |
| 5,536,555 A | 7/1996 | Zelazoski et al. | 428/138 |
| 5,580,423 A | 12/1996 | Ampulski et al. | 462/111.7 |
| 5,607,745 A | 3/1997 | Ogden | 428/138 |
| 5,613,427 A | 3/1997 | Wiley | 99/446 |
| 5,662,758 A | 9/1997 | Hamilton et al. | 156/221 |
| 5,709,897 A | 1/1998 | Pearlstein | 426/106 |
| 5,714,229 A | 2/1998 | Ogden | 428/138 |
| 5,718,955 A | 2/1998 | McGuire et al. | 428/35.7 |
| 5,804,241 A | 9/1998 | Isohata | 426/415 |
| 5,833,894 A | 11/1998 | Lanzani et al. | 264/46.3 |
| 5,888,604 A | 3/1999 | Evans, Jr. et al. | 428/47 |
| 5,925,406 A | 7/1999 | McGuire et al. | 427/208.2 |
| 5,965,235 A | 10/1999 | McGuire et al. | 428/156 |
| 6,037,022 A | 3/2000 | Adur et al. | 428/34.3 |
| 6,068,620 A * | 5/2000 | Chmielewski | 604/378 |
| 6,274,232 B1 * | 8/2001 | Otten et al. | 428/315.9 |
| 6,383,614 B1 * | 5/2002 | Carson et al. | 428/206 |
| 6,391,806 B1 * | 5/2002 | Carson et al. | 442/327 |

* cited by examiner

(part 1)

| Sheet No. | Absorbent Material | Cut-Resistant Particle Type | Average Particle Size (microns) | Particle Loading | Sheet Basis Weight (g/cm^2) | Sheet Thickness (in) |
|---|---|---|---|---|---|---|
| 1 | 75/25 SSK/Euc | PETG | 300 | 30% | 0.05 | 0.0248 |
| 2 (3 layers) | layer 1 – 100% SSK<br>layer 2 – 75/25%<br>layer 3 – 100% | PETG | 300 | layer 1 – 0%<br>layer 2 – 38%<br>layer 3 – 0% | 0.053 | 0.0267 |
| 3 | 75/25 SSK/Euc | PETG | 220 | 30% | 0.054 | 0.0241 |
| 4 (control sample) | 75/25 SSK/Euc | N/A | N/A | N/A | 0.052 | 0.0254 |
| 5 | 75/25 SSK/Euc | PETG | 300 | 30% | 0.037 | 0.0177 |
| 6 | 75/25 SSK/Euc | PETG | 220 | 30% | 0.029 | 0.0127 |

(part 2)

| Sheet No. | Absorbent Capacity (g/cm^2) | Absorbent Rate (g/s) | Absorbent Efficiency | Slice Resistance (kgf/cm) | Abrasion Loss– dry (mg/100 rev) | Abrasion Loss – wet (mg/100 rev) |
|---|---|---|---|---|---|---|
| 1 | 0.042 | 0.129 | 3.675 | 59.05 | 94.5 | 224.25 |
| 2 (3 layers) | 0.048 | 0.160 | 4.919 | 49.49 | 207 | 367 |
| 3 | 0.038 | 0.086 | 2.324 | 53.35 | 73.5 | 61.75 |
| 4 (control sample) | 0.061 | 0.200 | 8.081 | 49.21 | 372.3 | 547.25 |
| 5 | 0.029 | 0.089 | 2.460 | 38.34 | 94.75 | 223.75 |
| 6 | 0.028 | 0.082 | 3.046 | 49.21 | 63.75 | 304 |

ABSORBENT SHEET MATERIAL HAVING CUT-RESISTANT PARTICLES AND METHODS FOR MAKING THE SAME

RELATED APPLICATION

This Application is a Continuation-in-part of Ser. No. 09/336,494, filed Jun. 18, 1999, now U.S. Pat. No. 6,391,806 B1, the entire disclosure of which is hereby incorporated by reference herein.

TECHNICAL FIELD

The present invention relates generally to sheet materials which are cut-resistant, shred-resistant, and absorbent, and methods for making the same. More specifically, in one embodiment, the present invention relates to high basis weight paper structures which include randomly distributed polymer particles locked into the paper structure.

BACKGROUND OF THE INVENTION

Protective materials having durability, such as cut-resistance and/or wear-resistance have been used for many applications. For instance, protective materials can be used as cutting boards to cover countertops during food preparation, such as when cutting meats or vegetables for cooking. Such protective materials can protect the food item from contacting contaminants which may reside on the support surface, such as a countertop. In addition, such a material can also protect the support surface from physical damage from a cutting tool, as well as from contamination from the food item being prepared.

However, many materials which are protective are not absorbent. For instance, a rigid plastic cutting board will not absorb juices from food items, and these juices may run off the cutting board and soil the countertop or support surface. In addition, many such materials are not flexible, and thus are not easily stored, manipulated, and disposed. Also, because many rigid cutting boards are not intended to be disposed after use, they require cleaning after each use.

On the other hand, many materials, such as paper-like materials, can exhibit high absorbency and flexibility and are disposable. However, such materials typically lose a significant amount of strength when wet, and thus cannot adequately protect a support surface from cutting forces. Also, such materials are not typically shred-resistant and thus, if used as a cutting board, particles from the material may transfer to the food item being prepared.

Accordingly, many materials which are highly cut and shred resistant are typically undesirable for use as disposable cutting sheets, due to the low flexibility and low absorbency typically inherent in such materials, as well as the high cost of such materials. Conversely, many materials which are highly flexible or absorbent and of lower cost, are typically undesirable for use in such applications due to the low cut and shred resistance inherent in such materials. For instance, plastic materials are high in cut and shred resistance but low in absorbency, while conventional paper materials are typically high in absorbency but low in cut and/or shred resistance, since paper fibers can be easily released as a cutting tool is drawn over the cutting surface.

Polymeric fibers have previously been utilized as a binder and strengthening agent in paper structures. Typically, in such paper structures, fibers made from hydrophobic polymers are added to paper fluff during paper formation. During drying of the mixture, the polymeric fibers flow and coat the surrounding paper fibers locking the paper fibers into the structure and significantly reducing the overall absorbency of the resulting structure. While the amount of polymer fiber could be reduced from the mixture to increase absorbency, such a solution compromises the cut-resistance and shred-resistance of the structure. Thus, one problem with such structures is that the amount of polymer fibers required to achieve adequate cut-resistance and/or shred-resistance significantly reduces the absorbency of the structure.

Accordingly, it is desirable to provide a sheet material which exhibits good absorbency and also good cut and shred resistance. It is also desirable to provide such a material that is also relatively flexible so as to be readily disposable, and easily dispensed, stored, and manipulated. In addition, it is desirable to provide such sheet materials which, while durable in use, can be economically manufactured so as to justify their disposal after each use.

SUMMARY OF THE INVENTION

It is an object of the present invention to obviate the above-described problems.

Another object of the present invention is to provide a disposable and protective cutting sheet.

It is a further object of the present invention to provide a sheet material that is absorbent, cut-resistant and shred-resistant.

Yet another object of the present invention is to provide a sheet material that can be used to slice food items, and which can effectively absorb juice from the food items while simultaneously resisting damage from a cutting tool.

A further object of the present invention is to provide a sheet material that is resistant to shredding and can absorb significant amounts of fluid produced by food items.

Another object of the present invention is to provide a cut-resistant, absorbent, shred-resistant sheet material that is readily disposable.

Yet another object of the present invention is to manufacture a cut-resistant, absorbent, shred-resistant sheet material using conventional equipment.

To achieve the foregoing and other objectives, and in accordance with one aspect of the invention, a cut-resistant, shred-resistant, and absorbent sheet material is provided. The sheet material comprises at least 50 percent by weight of an absorbent material. A plurality of cut-resistant particles that have an average size of at least about 100 micrometers are distributed throughout the absorbent material. The sheet material preferably has a basis weight of at least 100 pounds per 3000 ft$^2$. It is also preferred that the absorbent material is substantially free of inorganic particulate filler.

According to another aspect of the invention, a method of forming a cut-resistant, shred-resistant, and absorbent sheet material is provided. The method comprises the steps of forming a mixture comprising absorbent fibers, non-fibrous polymeric particles, and water.

The polymeric particles have an average size of between about 100 and about 1000 micrometers, the absorbent fibers are provided in an amount of at least 50 percent by weight, and the mixture is substantially free of inorganic filler particulate. The mixture is formed into a sheet which is then dried. The dried sheet has a basis weight of at least 100 pounds per 3000 ft$^2$. Preferably, the sheet is densified using heat and pressure to lock in the polymer particles and to improve cut and shred resistance.

According to another aspect of the invention, an absorbent and shred-resistant sheet material is provided comprising an absorbent substrate and cut-resistant particles dispersed through the absorbent substrate. The sheet exhibits a wet abrasion loss of less than about 400 mg per 100 revolutions and an absorbent efficiency of at least 0.2. It is preferred that the cut-resistant particles have an average size of at least about 100 micrometers. It is also preferred that the sheet has a basis weight of at least 100 pounds per 3000 ft$^2$, that the absorbent substrate is provided in an amount of at least 50 percent by weight, and that the absorbent substrate is substantially free of inorganic particulate filler. Preferably, the sheet material exhibits a cut resistance of at least 30 kgf/cm.

Still other objects of the present invention will become apparent to those skilled in the art from the following description wherein there is shown and described preferred embodiments of this invention, including a best mode currently contemplated for carrying out this invention, simply for the purposes of illustration. As will be realized, the invention is capable of other different aspects and embodiments without departing from the scope of the invention. Accordingly, the drawings and descriptions are illustrative in nature and not restrictive in nature.

BRIEF DESCRIPTION OF THE DRAWINGS

While the specification concludes with claims particularly pointing out and distinctly claiming the invention, it is believed that the same will be better understood from the following description of preferred embodiments, taken in conjunction with the accompanying drawings in which:

DETAILED DESCRIPTION OF PREFERRED EMBODIMENTS

Figure 1:
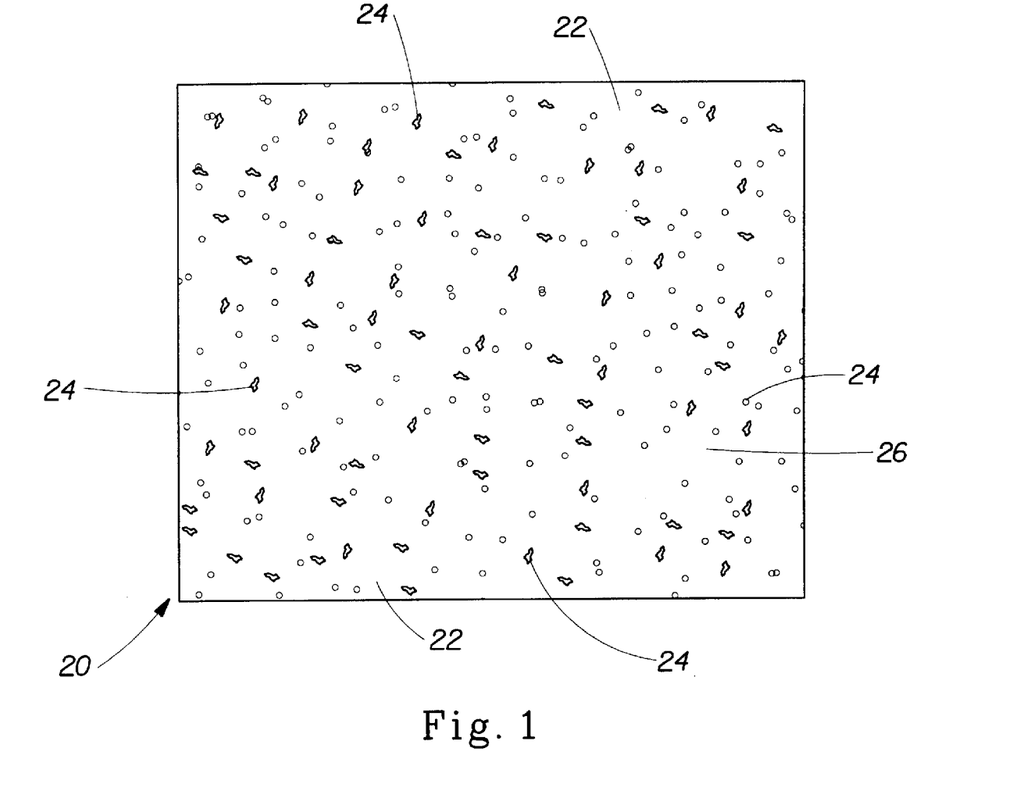
FIG. 1 is a plan view of an exemplary sheet of material, made according to principles of the present invention.
Figure 2:
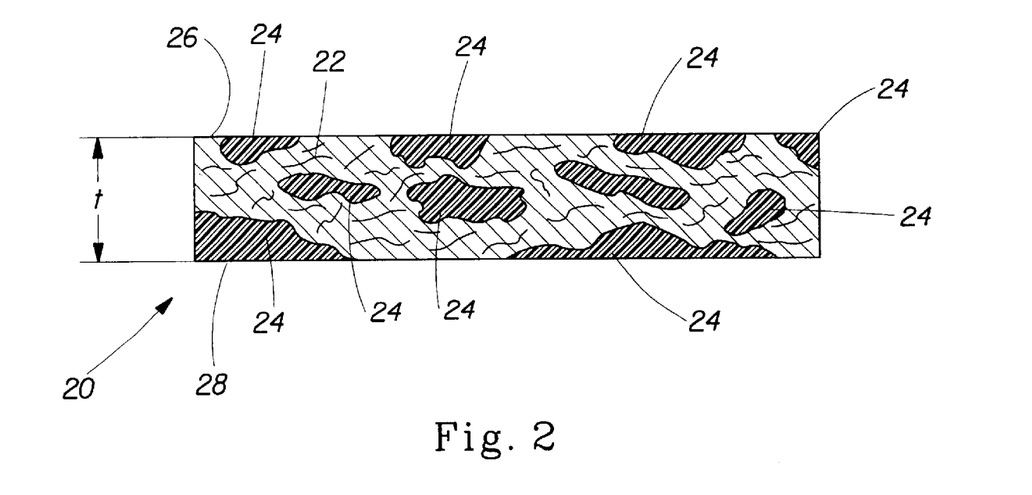
FIG. 2 is a cross-sectional view of the exemplary sheet material of FIG. 1.

Turning now to the drawings in detail, wherein like numerals indicate corresponding structure throughout the views, FIG. 1 is a plan view of an exemplary sheet material 20 made according to principles of the present invention. In this embodiment, the sheet material 20 includes an absorbent substrate 22 and a plurality of cut-resistant particles 24 randomly dispersed throughout the substrate 22. As best shown in the cross-sectional view of FIG. 2, the sheet 20 is of a substantially uniform thickness t, and includes a cutting surface 26 and a second surface 28. Preferably, the surfaces 26 and 28 are substantially planar.

The continuous absorbent substrate 22 may be formed from any material or materials suitable for absorbing and/or containing fluids of interest. For example, suitable materials include materials formed from natural fibers, such as cellulosic fibers or refined cellulosic fibers, and/or synthetic fibers, including hollow fibers and capillary channel fibers. As an alternative to or in combination with such fibers, the absorbent substrate 22 could include an absorbent polymeric foam material, an absorbent polymeric gelling material, a hydrogel material, and/or natural starches and gums, for example. Materials of particular interest include cellulosic substrates, such as paperboard, such as are typically used in paper manufacturing. As described in further detail below, SSK (Southern Softwood Kraft), NSK (Northern Softwood Kraft), or eucalyptus cellulosic fiber fluff could be used to form the substrate 22. The substrate 22 could alternatively comprise a non-woven substrate, such as can be constructed by entangling synthetic fibers for instance.

In the embodiment of FIG. 1, the absorbent substrate 22 comprises a continuous layer of material. However, the substrate 22 could comprise a laminate structure having a plurality of layers of the same or differing composition. Moreover, the absorbent substrate 22 may comprise an absorbent or non-absorbent carrier web that may include an absorbent material.

The cut-resistant particles 24 may be formed from any durable material or materials which are substantially resistant to cutting, abrasions, and shredding from cutting utensils used for food preparation, such as kitchen knives for instance. Typical materials which exhibit such properties may be utilized, including those which exhibit a high degree of toughness and a crystalline molecular structure. In the preferred embodiment, the cut-resistant particles 24 are made from polymeric materials, such as ethylene vinyl acetate (EVA), high density polyethylene (HDPE), low density polyethylene (LDPE), linear low density polyethylene (LLDPE), polyvinyl chloride (PVC), plastisols, polypropylene (PP), polyethylene teraphthalate glycol modified (PETG), ultra high molecular weight polyethylene UHMWPE), polystyrene, and/or polyurethanes. Other thermoplastics, thermosets, polyolefins, polymeric and/or glass composite materials can also be used. Furthermore, the particles 24 may include melamine formaldehyde polymers or polymeric materials compounded with fillers and/or additives, such as talc, mica, calcium carbonate, and/or other inorganic fillers.

Preferably, the material utilized for the cut-resistant particles 24 has a low enough melting temperature $T_m$ such that it will soften at temperatures which will not cause the substrate 22 to char or burn during the application of heat. Such a material can thereby be partially bonded to the substrate 22 through the application of heat and/or pressure, preferably during a subsequent process which densities the sheet material produced during an initial sheet making process. Such a process can also increase the cut resistance and shred resistance of the sheet material. It is preferred that the melting temperature of the particles be less than or equal to about 450° F. Preferably, the material used for the particles 24 has a Vicat softening point (using ASTM test D1525) of less than about 185° F., to allow it to more readily lock or bond to the substrate 22 under relatively low or moderate temperature. One preferred material for use in the particles 24 is the polymer "PETG", such as, for example, is sold under the tradename EASTAR PETG COPOLYESTER 6763 by EASTMAN CHEMICAL CO, and which has a Vicat softening point of around 185° F. Such a material has a good cut and shred resistance and also has a relatively moderate softening point to allow it to be more readily locked into the substrate 22 through heat and/or pressure, without charring or burning the substrate. Moreover, PETG is less hydrophobic than many other thermoplastics, and so the sheet 20 thereby maintains good overall absorbency. Another preferred material for use in the particles 24 is polystyrene.

As noted above, the particles 24 could also comprise compounded polymeric materials. For example, tough inorganic fillers can also be provided in combination with one or more polymers to form the particles 24, in order to reduce the cost of the particles 24 and/or change particle toughness, density, cut-resistance, color, or other property. Suitable fillers include $CaCO_3$, talc, and mica, for example. However, although particulates and fillers can be used to form particles 24, it is preferred that absorbent substrate 22 is substantially free of inorganic free filler particulate. As used herein, the term "free filler particulate" refers to inorganic particles which are not bonded to the absorbent substrate 22 and which merely reside freely within the absorbent substrate. Such a material may be released from the sheet 20 during cutting operations and be mixed with the food items being prepared, potentially making the food undesirable in appearance and/or unsuitable for consumption. It is also preferable that the absorbent substrate 22 is substantially free of organic free filler particulate which is not suitable for contact with food items. Organic free filler particulate does not refer to the absorbent substrate material, such as cellulosic fibers and the like as described herein. By "substantially free" what is meant is an amount no greater than that which would be safe for use of the absorbent substrate in food preparation, or less than an amount in which the filler particulate released during food preparation is noticeable by visual or tactile inspection of the absorbent substrate or food items, or both. By tactile inspection, what is meant is tactile sensory via the hand, or, with respect to food items, the mouth. Preferably, 0% of such free filler particulate is added to the substrate. If free filler particulate is included, however, the level should preferably be no greater than about 10%, more preferably no greater than about 5%, more preferably no greater than about 2%, more preferably no greater than about 1%, more preferably no greater than about 0.5%, and most preferably no greater than about 0.1% by weight of the dry sheet. Notwithstanding the above, the sheet hereof can be substantially free of free filler particulate if it contains unbonded particulate material, but none of the particulate material is releasable when the absorbent sheet is used as intended (i.e., by placing a food item on the side of the sheet intended to be used for cutting, and cutting the food item while it is on this side of the sheet.) Thus, the sheet can be substantially free of filler particulate when it includes unbonded particulate material which is positioned or configured such that little or none is released from the cutting surface during cutting. In particular, it is preferred that at least the cutting surface of the sheet material is shred resistant and exhibits a wet abrasion loss (according to the test described below) of less than about 400 mg per 100 revolutions, and more preferably less than about 300 mg per 100 revolutions. In addition, it is also preferred that the cutting surface of the sheet material exhibits a dry abrasion loss (according to the test described below) of less than about 300 mg per 100 revolutions, and more preferably less than about 200 mg per 100 revolutions.

Because of the absorbent material or materials used in the substrate 22, the sheet material 20 can absorb and sequester fluids deposited on the surfaces 26 and 28. Moreover, because relatively large polymer particles 24 are preferably used, rather than smaller polymer fibers which can coat the materials of the substrate 22 during formation of the final sheet, much of the absorbency of the substrate 22 is maintained. In other words, the polymer particles 24 do not completely cover or surround materials of the substrate 22, and therefore do not significantly mask their absorbent properties. Accordingly, more polymer 24 can be provided in the sheet 20 without significantly impacting the absorbency of the sheet. In contrast, the same amount of small polymer fiber has been found to completely disperse through the structure and surround the material of the substrate 20 and lock out much of its absorbency.

In this regard, it is preferred that the polymeric particles 24 are provided in amounts of up to about 50 percent by weight of the sheet 20. More preferably, the particles 24 are provided in amounts of between about 10 percent and about 40 percent by weight, and most preferably in an amount of around 30 percent by weight. It is also preferred that the absorbent material within the sheet 20 is provided in amounts of at least 50 percent by weight, in order to provide good absorbency. The particles 24 are preferably non-fibrous and the average size of the particles used is preferably at least about 100 micrometers. It should be noted that while some particles may have sizes below 100 micrometers, the average size of all the particles used is preferably at least about 100 micrometers. More preferably the average size of the particles is between about 100 and 1000 micrometers, and most preferably between 200 micrometers and 500 micrometers.

Furthermore, the polymer particles 24 are preferably randomly and widely distributed throughout the sheet 20 to provide good cut-resistance and shred-resistance to the sheet. Such a dispersion provides a high probability that a cutting utensil contacting one of the surfaces 26 or 28 will make contact with one or more of the tough particles 24, thereby reducing the risk that the absorbent substrate 22 will cut or shred in response to the force of the cutting utensil. Particles 24 beneath the cutting surface 26 or 28 can also help minimize cutting and/or shredding of the absorbent substrate 22. The polymer particles 24 are preferably located in fairly discrete areas of the structure, to thereby allow for large areas of the absorbent substrate 20 to be exposed on surfaces 26 and 28 to absorb fluid.

The sheet material 20 preferably has a relatively high basis weight. For example, basis weights of at least 100 pounds per 3000 ft$^2$ are preferred to provide adequate cut-resistance and absorbency. More preferably, the basis weight of the sheet material 20 is at least 165 pounds per 3000 ft$^2$, and most preferably the basis weight of the sheet material is at least 300 pounds per 3000 ft$^2$. Also, the sheet material 20 preferably has a thickness t of between about 250 microns (0.01 inch) and about 1270 microns (0.05 inch) to provide adequate cut-resistance and absorbency. If paper making processes and machinery are used to produce the sheet 20, manufacturing parameters such as material application rate, wire rate, amount and duration of pressure applied, etc. can be adjusted to manipulate the basis weight and thickness of the resulting sheet 20.

Figure 3:
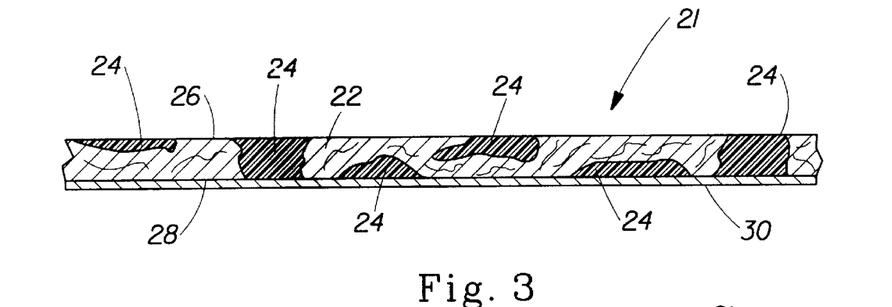
FIG. 3 is a cross-sectional view of an embodiment of a layered sheet material, made according to principles of the present invention.

As shown in FIGS. 3–7 and 12, the densified sheet material 20 can be combined with one or more similar or differing layers, to produce a layered structure 21 having advantages of the various layers. For instance, as shown in the embodiment of FIG. 3, the sheet material 20 can be attached to a backing layer 30 to create a multi-layer sheet 21. The backing layer 30 may be formed from any material or materials suitable for attaching as a layer or coating to the sheet 20. Suitable materials include polymeric films, thermoplastic resins, clay coatings, paperboards or metallic foils. The backing layer 30 can comprise one integral layer of material, or a laminate structure having multiple layers of the same or differing composition. The backing layer 30 may also have a high coefficient of friction so as to provide skid resistance, or a non-skid surface, to the sheet structure 21. To provide skid resistance, the backing layer 30 preferably has a static coefficient of friction of at least about 0.4, and more preferably a coefficient of friction of at least 1 with respect to the support surface (e.g., countertop) to provide a corresponding slip angle of around 45 degrees. In addition, the backing layer 30 is preferably fluid impervious to resist the escape of fluid from the sheet 20, thereby avoiding contamination of the countertop during use.

The layer 30 can be bonded or laminated to the sheet material 20, extruded or thermo-formed onto the sheet 20, or printed, sprayed, adhered, coated, hot-pressed, or otherwise applied to the sheet 20. For instance, for applying a layer, such as the backing layer 30, to the cut-resistant and absorbent sheet 20, a hot band press system can be utilized. In addition to be useful for applying the extra layer 30 to the sheet 20, such a hot band press system can also be used for densification of the sheet 20 to increase its cut-resistance and shred-resistance, and/or to cause the polymer particles in the sheet 20 to bond to and/or partially lock around the absorbent material of the sheet.

Figure 14:
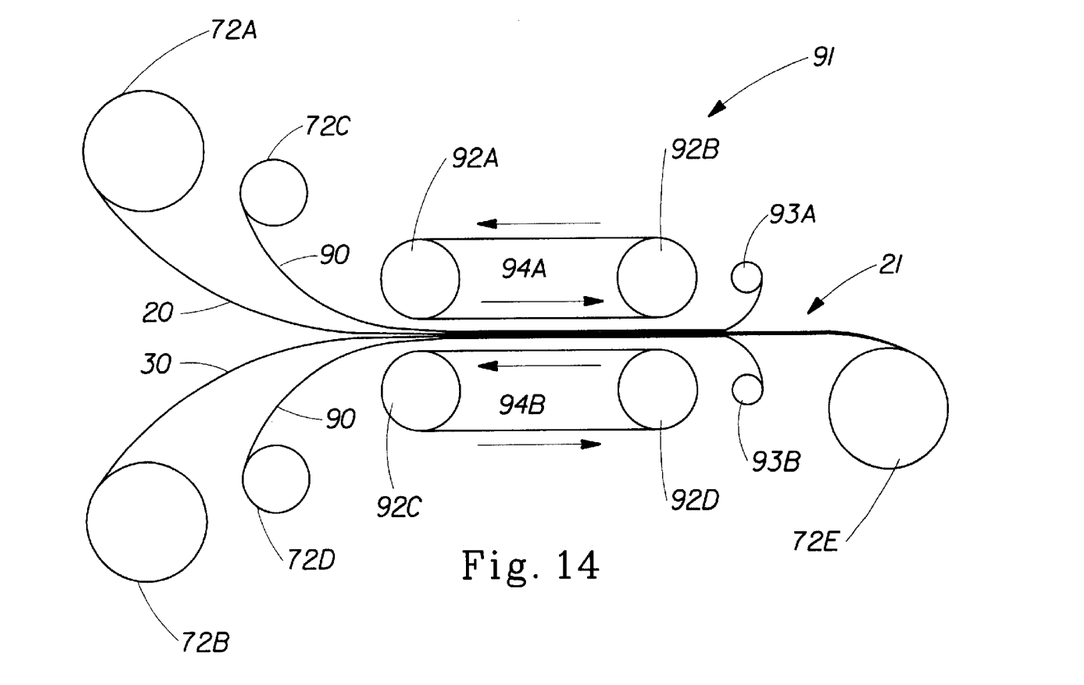
FIG. 14 is a schematic diagram illustrating exemplary equipment and a process that can be used to densify sheet material, such as the sheet materials of FIGS. 2–8 and 11–12.

An example of an embodiment of a hot band press system 91 is illustrated in FIG. 14. As shown in this figure, an undensified sheet 20 may be fed from a spool or roll 72A, and the backing layer 30 can be fed from a spool 72B. Release paper 90 can be fed from spools 72C and 72D to cover the outward facing surfaces of the sheet 20 and the layer 30, to prevent the sheet and layer from sticking to the hot press 91. The four layers (90, 20, 30 and 90) are fed together through the hot press 91 to bond or laminate sheet 20 with backing layer 30, and also to densify the sheet 20, locking the polymer particles into the sheet. The hot press 91 includes a pair of heated rollers 92A and 92B which move a steel belt 94A and transfer heat thereto. Likewise heated rollers 92C and 92D move and heat steel belt 94B. The four layers are heated and pressed between the two belts 94A and 94B and are moved therebetween to form the layered material 21, which can be taken up on a spool 72E. The release papers 90 can be rewound on rewind rollers 93A and 93B.

Figure 4:
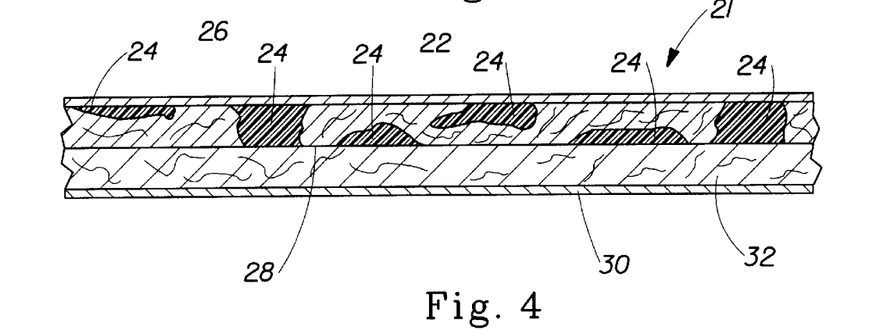
FIG. 4 is a cross-sectional view of a further embodiment of a layered sheet material made in accordance with the present invention.

It should be understood that, while the backing layer 30 is used in the exemplary implementations shown in FIGS. 3, 4 and 14, it is not necessary to include the backing layer. In particular, the sheet material 20 can be densified alone using the system of FIG. 14, and then used as a densified sheet having no backing layer. Conversely, while the embodiments of FIGS. 1–2, 5–8, and 11–12 are shown without a fluid impervious backing layer 30, it should be understood that any of these embodiments could be provided with such a layer to increase skid resistance and/or resist the escape of fluid from the sheet materials 20.

As shown in the embodiment of FIG. 4, in addition to or as alternatives to the backing layer 30, other layers may be provided as well to enhance properties of the sheet 20, or add features thereto. For instance, a top layer 34 may be laminated, coated, bonded, flocked, or otherwise applied to the first surface 26 of the sheet 20, to create a multi-layered sheet structure 21. The top layer 34 can comprise a surfactant to increase the rate of absorption of fluid into the sheet 20. The use of such a surfactant may allow for higher amounts of polymer 24 in the sheet 20 without sacrificing absorbency. Alternatively, the layer 34 could comprise a treatment layer to reduce shredding of the product. Starch, polyvinyl alcohol, or other sizing agents could be utilized for this purpose. The layer 34 could also comprise an application of surfactant, anti-bacterial agent, deodorizing agent, or clay coating. To change the visual appearance of the layered structure 21 or of the sheet 21, a pattern, design, or indicia could be applied thereto. For example, a pattern may be embossed, printed, pressed, or otherwise applied to an exterior surface 26 of the sheet 20 (if used without any additional layers) or to the exterior surfaces of any layer (e.g., layers 30 or 34) which may be applied to the sheet 20.

As also shown in FIG. 4, an absorbent layer 32 can be provided between the backing layer 30 and the sheet material 20. The absorbent layer may be formed from any material or materials suitable for absorbing and/or containing the fluids of interest. For example, natural and/or synthetic fibers, absorbent foams, absorbent gelling materials, hydrogels, paper fluff, and other materials could be utilized. Because such an additional absorbent layer 32 can absorb and sequester fluids from the sheet material 20, the sheet 20 can be made less absorbent and more cut and shred resistant by increasing the percentage by weight of particles 24 in the sheet. Moreover, juices produced by the item placed on the top layer 34 can be pulled into the absorbent layer 32, thereby spacing the item from the juices.

Figure 5:
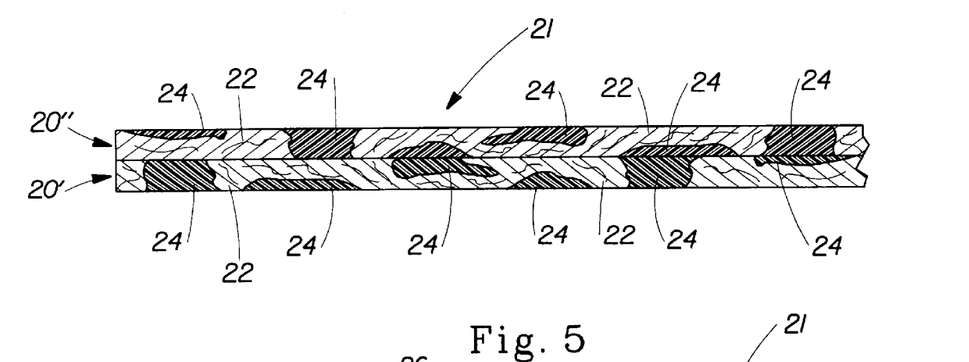
FIG. 5 is a cross-sectional view of another embodiment of a layered sheet material made in accordance with the present invention.

In addition, sheet materials 20 such as those of FIG. 1 can be laminated, bonded, or otherwise adhered to like sheet materials 20. Such a configuration of layering two sheet materials 20' and 20" to form a multi-layered sheet 21 is shown in FIG. 5. The resulting layered sheet 21 may have higher cut resistance when compared to the single sheet materials 20' and 20". In this embodiment, cut-resistant particles 24 in the sheet 20' are less densely distributed than the cut-resistant particles 24 of the sheet 20". Thus, the lower sheet 20' can provide more absorbency than the upper sheet 20", and the upper sheet 20" can provide more cut resistance and shred resistance than the lower sheet 20'.

Figure 6:
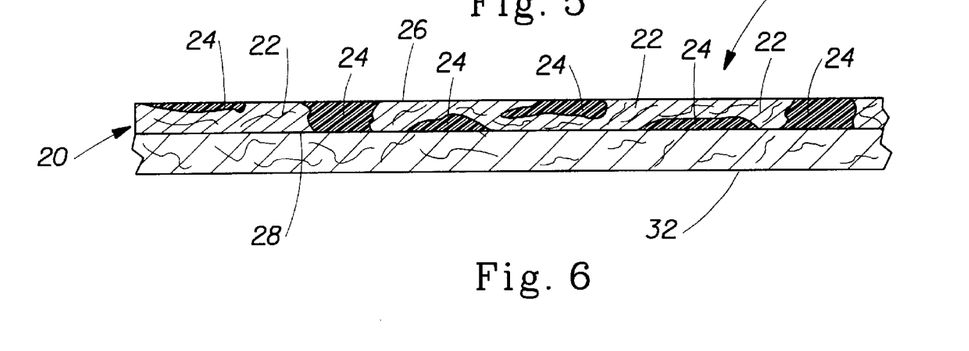
FIG. 6 is a cross-sectional view of a further embodiment of a layered sheet material made in accordance with the present invention.

FIG. 6 illustrates another embodiment of a layered sheet 21, wherein the sheet material 20 is combined with an absorbent layer 32. The absorbent layer 32 can comprise any suitable absorbent material, such as those absorbent materials mentioned above for example. By providing the absorbent layer 32 in combination with the sheet material 20, the cut resistance and shred resistance of the sheet material 20 can be increased by increasing the percent weight of the particles 24 in the sheet. For example, particles 24 can comprise polymer or compounded polymer material and can be provided in an amount of about 50 percent by weight of the sheet material 20. The resulting sacrifice in the absorbency of the sheet material 20 is significantly compensated by the addition of the absorbent layer 32. In particular, the absorbent layer 32 can be used to draw fluid from the surface 26 of the sheet material 20, on which food items may be placed for cutting. Accordingly, the multi-layer sheet structure 21 can exhibit high cut resistance and high absorbency.

Figure 7:
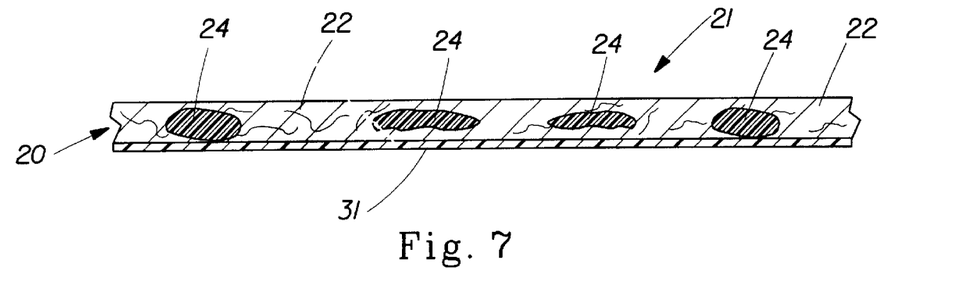
FIG. 7 is a cross-sectional view of a yet another embodiment of a layered sheet material made in accordance with the present invention.

FIG. 7 illustrates another embodiment of a multi-layered structure 21 which utilizes a sheet material 20 made according to the present invention. In this exemplary embodiment, a cut-resistant backing layer 31 is laminated, bonded, coated, or otherwise applied to the sheet material 20 to form the structure 21. The backing layer 31 can comprise a cut-resistant material, such as a polymeric material. Because the sheet material 20 is combined with the cut resistant layer 31, the percent by weight of the polymer particles 24 in the sheet material can be decreased to thereby increase the absorbency of the sheet material 20. For example, polymer particles 24 can be provided in an amount of about 10 percent by weight of the sheet structure 20. The resulting decrease in cut-resistance of the sheet material 20 is significantly compensated by the cut-resistance of the backing layer 31. In addition to being cut-resistant, the backing layer 31 is also preferably skid resistant and fluid impervious.

Figure 8:
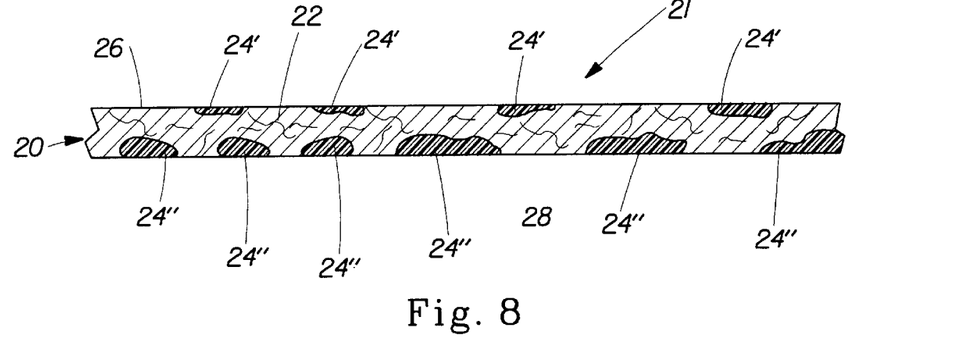
FIG. 8 is a cross-sectional view of a further embodiment of a sheet material made in accordance with the present invention.

FIG. 8 illustrates an embodiment of a sheet material 20, where the cut-resistant particles 24 are provided in a plurality of densities. In particular, smaller and less dense particles 24' are provided in addition to larger and more dense particles 24". The overall weight of the combination of the particles 24' and 24" is preferably between about 10 per cent and about 50 per cent of the total weight of the sheet material 20. Because the particles 24" are more dense than the substrate 22, they tend to gravitate toward the first surface 28 of the sheet material 20 during formation thereof. Likewise, because the particles 24' are less dense than the substrate 22, they tend to form near the second surface 26 of the sheet material 20 during formation thereof. Accordingly, the sheet material 20 may exhibit a higher absorbency rate when the fluid is provided on the second surface 26 than when the fluid is provided on the first surface 28. However, the first surface 28 may exhibit a higher cut resistance than the surface 26. Thus, the first surface 28 may be used to prepare food items, while the second surface 26 may be placed on a supporting surface, such as a kitchen countertop.

Figure 11:
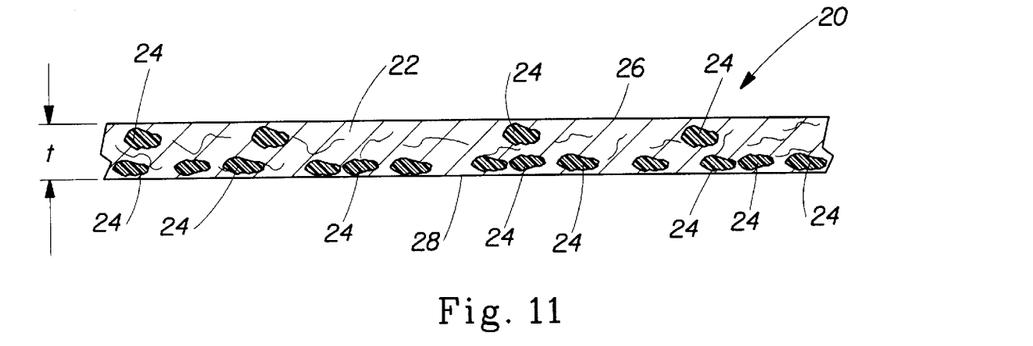
FIG. 11 is a cross-sectional view of another embodiment of a sheet material made in accordance with the present invention.

Another variation of such an embodiment is illustrated in FIG. 11. In this embodiment, the particles 24 are distributed in a gradient across the thickness t of the sheet 20. More particles 24 are located near the surface 28 than are located near the surface 26. This can be accomplished in a variety of ways in the formation process, such as, for example, by using particles 24 which are more dense than the absorbent 22. Thus, the absorbency and cut resistance vary across the thickness t of the sheet 20.

Figure 9:
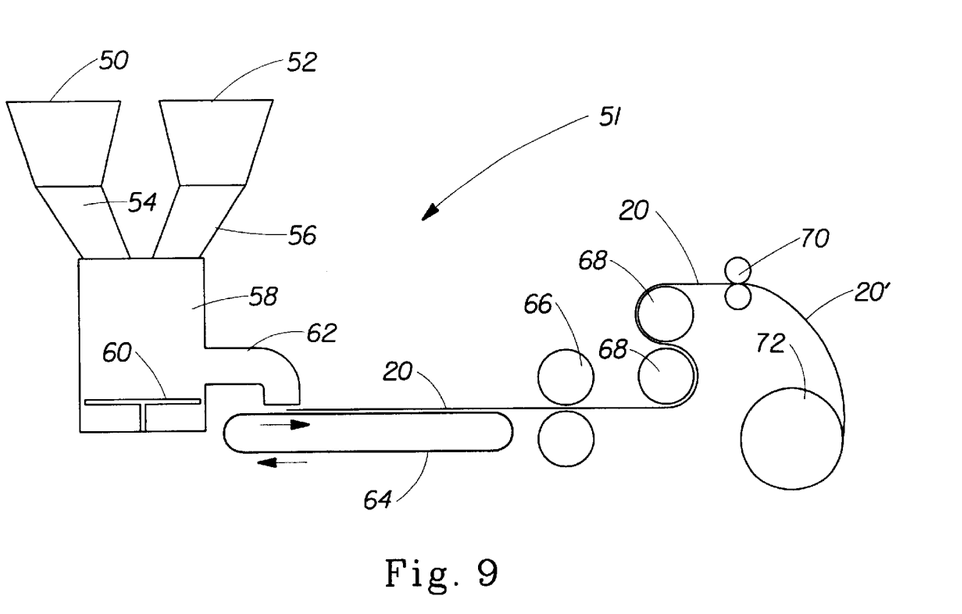
FIG. 9 is a general schematic illustration of a sheet processing system suitable for manufacturing the sheet material of FIG. 1 in accordance with principles of the present invention.
Figure 10:
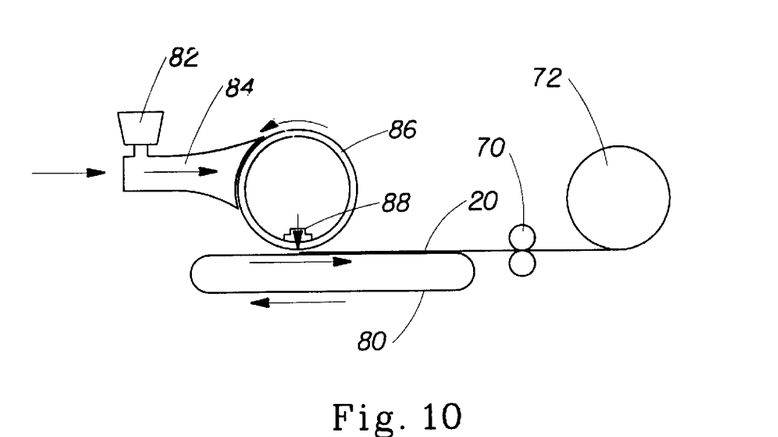
FIG. 10 is a general schematic illustration of an alternative sheet processing system suitable for manufacturing the sheet material of FIG. 1 according to principles of the present invention.

FIGS. 9 and 10 illustrate exemplary equipment and processes for producing the sheet 20 according to principles of the present invention. In the example of FIG. 9, an undensified sheet material 20 is manufactured using paper making equipment 51, and a densification process is subsequently conducted to better lock the polymer particles into the sheet material and to produce a densified sheet material 20' having increased cut and shred resistance. In particular, in FIG. 9, cellulose fibers in solution are supplied from a chest 50, and polymer particles in solution are supplied from a chest 52. The materials travel through chutes 54 and 56 and into a mixing chamber 58 where the materials are further blended with water to form an aqueous dispersion. The mixing chamber 58 includes an agitator 60 to assist in the blending process.

The slurry is then fed from the mixing chamber and through a headbox 62, from which it is fed onto a wire belt 64 or screen where it forms a wet sheet 20. The polymer particles are large enough to be restrained from falling through the wire belt 64. However, water from the sheet can fall through the wire belt 64 as it begins to dry. Further drying can be achieved by feeding the sheet through press rolls 66 to mechanically remove water in the sheet or through a vacuum to suction water from the sheet. The sheet 20 can be supported on a woolen felt when moved through the press rolls 66. Dryer rolls 68 can then apply heat to the undensified sheet 20 to accomplish further drying by evaporation. In subsequent densification processing, it is preferred that additional heat and/or pressure are applied by the rolls 70, to cause the polymer particles to flow and thereby be further locked into the sheet. For example, rolls 70 could comprise a series of rolls, such as a calendar stack, to lock the particles into the sheet. As previously described in FIG. 14, a heated band press could also be utilized for the densification process. The resulting dried and densified sheet 20' can then be wound on a spool 72.

FIG. 10 illustrates air-laying equipment which can also be used to produce the sheet according to principles of the present invention. In this example, the cellulose fibers and polymer particles are provided via hopper 82 where they are blown through a chute 84 into an air-laying drum 86. In the drum 86, the cellulose fibers and polymer particles are throughly mixed and blended. The mixture is then fed through an air-blow-off plenum 88 and formed onto a belt 80. In subsequent processing, rollers 70 can be used to apply heat and/or pressure to the formed sheet 20 to allow the polymer particles to flow and become locked into the sheet. A spool 72 can then be utilized to wind the sheet material 20.

Figure 12:
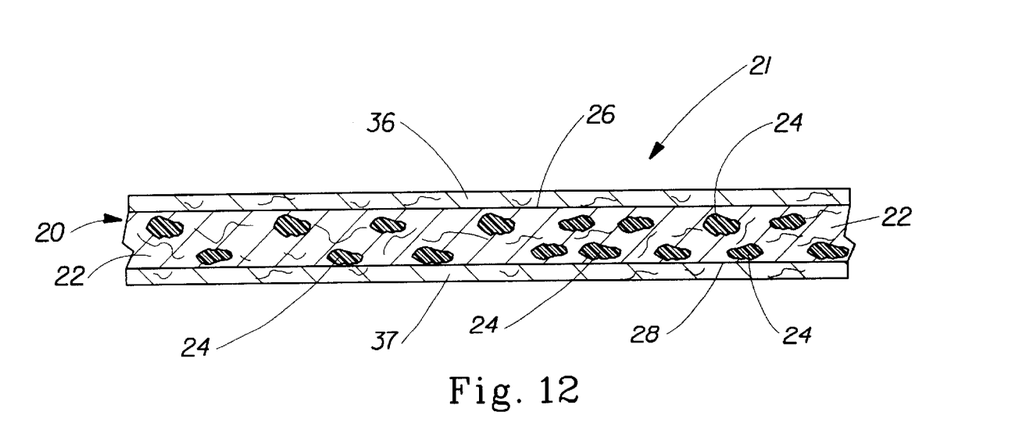
FIG. 12 is a cross-sectional view of another embodiment of a layered sheet material made according to principles of the present invention.

FIG. 12 illustrates another alternative layered sheet 21, made according to principles of the present invention. In this embodiment, the layered sheet 21 comprises a top layer 36, a bottom layer 37, and an absorbent and cut-resistant sheet material 20. As described above, the sheet material 20 includes an absorbent substrate 22 and cut-resistant polymeric particles 24. The substrate 22 and particles 24 can be made from one or more of the exemplary materials described above. For example, the substrate 22 preferably comprises cellulosic material and the particles 24 preferably comprise polymeric material. Also, as noted above, the particles have an average size of at least about 100 micrometers, and the absorbent substrate 22 is substantially free of any inorganic filler and provided in an amount of at least 50 percent by weight of the sheet 20. The basis weight of the sheet 20 is preferably at least 100 pounds per 3000 ft$^2$, and most preferably around 250 pounds per 3000 ft$^2$.

The top layer 36 and bottom layer 37 are preferably free of polymeric particles, and can be made of any material capable of substantially covering the surfaces 26 and 28 of the sheet 20, to thereby restrain particles 24 from becoming freed from the sheet 20 during manufacture. For example, the top layer 36 and bottom layer 37 can be made from paper, paper-board, paper-like materials, or non-woven materials. It has been found that when particles 24 become detached or freed during manufacture of a sheet 20, they may stick to or melt on various parts of the manufacturing equipment. Accordingly, it is desirable to provide one or more components which assist in retaining the particles 24. The layered structure 21 of FIG. 12 is one preferred configuration for retaining the particles 24 within the sheet 20. Other methods and/or components could be utilized in addition to or as alternatives to use of the layers 36 and 37. For example, in addition to or as an alternative to providing layers 36 and 37, a retention agent or aid could be included within the sheet 20 to further assist in locking the particles 24 within the sheet 20. In addition to serving a retention function during manufacture of the sheet 20, the layers 36 and 37 could enhance other properties of the sheet, such as appearance and performance properties for example, after the sheet is manufactured.

The layers 36 and 37 can be bonded or laminated to the sheet material 20, extruded or thermo-formed onto the sheet 20, or printed, sprayed, adhered, coated, pressed, or otherwise applied to the sheet 20. Moreover, the layers 36 and 37 can each comprise one integral layer of material, or a laminate structure having multiple layers of the same or differing composition.

Figure 13:
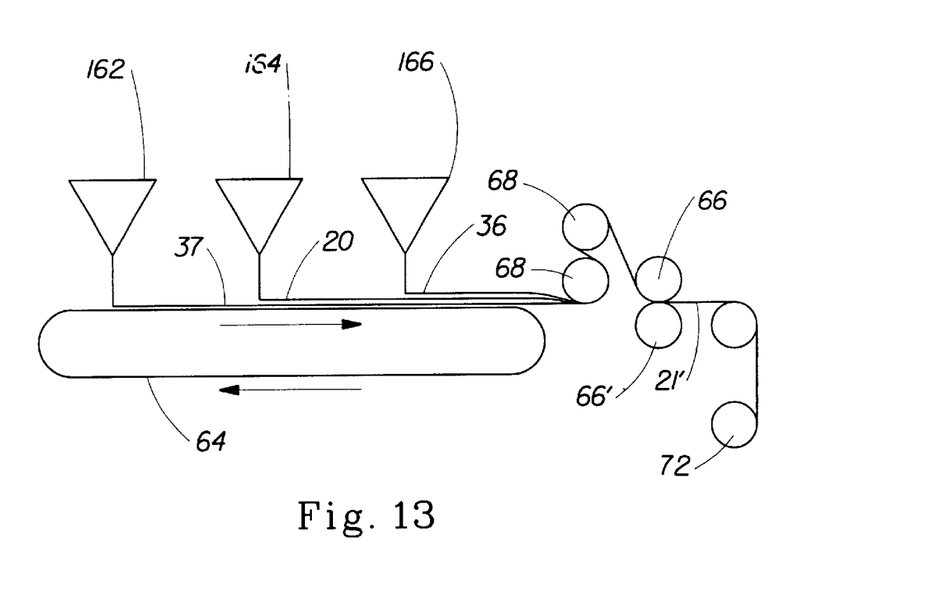
FIG. 13 is a schematic diagram illustrating a process and related equipment that can be used for manufacturing the layered sheet material of FIG. 12.

FIG. 13 illustrates a potential method for manufacturing the layered structure 21 of FIG. 12 using conventional paper manufacturing equipment 51, such as equipment which manufactures paper or paperboard, for example. In this example, cellulose fibers in solution are continuously provided through headbox 162 onto the wire screen or mesh 64 to form the lower layer 37. Next, as the layer 37 travels along the wire 64, a cellulose and polymer particle slurry is continuously fed through the headbox 164 on top of the layer 37 to form the layer 20. Finally, as the layers 37 and 20 travel further along the wire 64, cellulose fibers in solution are continuously provided on top of the layer 20 to form the top layer 36. The undensified layered structure 21 can be fed through one or more dryer rolls 68 to complete the drying of the structure.

In a subsequent densification process, the three layers 36, 20, and 37 which make up the structure 21 can then be bonded, pressed or laminated together to form a densified layered structure 21'. For example, a plurality of heated rolls 66 and 66' can be provided, such as are utilized in a calendar stack. The structure 21 can be pressed and heated between the rolls 66 and 66', to cause the polymer particles to be locked into the structure, and to form the densified structure 21', which can then be collected on a spool 72.

Preferably, the top and bottom layers 36 and 37 are each significantly thinner than the sheet 20, and have a significantly lower basis weight than the sheet 20. For example, the layers 36 and 37 can each be provided at a basis weight of about 35 pounds per 3000 ft$^2$ and the sheet 20 can be provided at a basis weight of about 250 pounds per 3000 ft$^2$. Preferably, each of the layers 36 and 37 contribute between about 10 to 25 percent of the basis weight of the resulting layered structure, with the middle layer contributing between about 50 to 80 percent of the basis weight.

As an alternative to using the layers 37 and 36 to retain the particles 24 within the sheet 20, the manufacturing equipment can be chosen to accommodate particles which may stick to the equipment. For example, the equipment can be provided with blades, such as doctor blades, to periodically scrape material from rolls or other components. Also, the components, such as the dryer rolls for example, may be coated with a non-stick finish, such as Teflon for example, to prevent material from building up. As another alternative, the equipment can use air floatation devices to prevent the sheet material 20 from contacting components. Processing the sheet material 20 at lower heat may also prevent the polymer particles 24 from melting and sticking to the equipment.

EXAMPLES

Sheet materials made according to the present invention will be further illustrated by the following examples. In each example, the listed type, size, and amount of polymer particles are mixed with the listed type and amount of cellulose materials. The mixture is sufficiently blended with water to provide random and substantially wide distribution of the particles and paper fibers. The aqueous dispersion is applied to a wire screen to allow the water to drain therethrough leaving a moist mat of paper and polymer particles on top of the screen. The mat is then dried to remove remaining moisture. Once dried, the cellulose fibers bond with one another, as known in the art. The resulting undensified sheet is then subjected to the listed temperature and pressure in a heated platen press for the duration indicated, to allow the polymer to flow somewhat and more securely bond to the cellulose substrate, and to densify the structure for increased cut and shred resistance.

| No. | Cellulose Type | Cellulose Amt. | Polymer Type | Polymer Amt. | Average Polymer Particle Size | Temp. | Pressure | Time |
|---|---|---|---|---|---|---|---|---|
| 1 | SSK fluff | 25 g | PETG particles | 12 g | 250 micrometer | 380° F. | 833 psi | 30 s |
| 2 | SSK fluff | 25 g | PETG particles | 15 g | 250 micrometer | 380° F. | 700 psi | 20 s |
| 3 | SSK fluff | 25 g | PETG particles | 15 g | 500–1000 micrometer | 380° F. | 1100 psi | 20 s |
| 4 | SSK fluff | 25 g | polypropylene particles | 11 g | 500–1000 micrometer | 380° F. | 833 psi | 20 s |
| 5 | SSK fluff | 25 g | melamine formaldyhyde particles | 20 g | 500–1000 micrometer | 380° F. | 833 psi | 30 s |
| 6 | SSK fluff | 34 g | PETG particles | 15 g | 250 micrometer | 380° F. | 280 psi | 30 s |
| 7 | SSK fluff | 34 g | PETG particles | 23 g | 250 micrometer | 380° F. | 280 psi | 30 s |
| 8 | SSK fluff | 34 g | polypropylene particles | 15 g | 500–1000 micrometer | 380° F. | 280 psi | 30 s |
| 9 | SSK fluff | 34 g | polypropylene particles | 15 g | 1000–2000 micrometer | 380° F. | 280 psi | 30 s |
| 10 | SSK fluff | 34 g | polypropylene particles | 23 g | 1000–2000 micrometer | 380° F. | 280 psi | 30 s |

In addition to the SSK fluff shown in the examples, other suitable paper materials could be utilized, including NSK fluff, eucalyptus, chemithermomechanical pulp (CTMP), and thermomechanical pulp (TMP) for example. Moreover, one or more layers can be added to the sheet structure to enhance performance or provide other properties. For example, a backing layer can be applied to the sheet material to resist the escape of fluid and provide a skid resistant surface. Dyes can be added to the paper or the polymer or the mixture thereof, to make the resulting sheet more visually appealing. For example, dyeing the paper or the polymer can produce a marble-like appearance. Additives can also be used to improve the dispersion of the polymer particles throughout the paper. For instance, surfactant, retention aids, drainage aids, deposit control agents and the like could be added. As noted above, other additives, such as anti-bacterial substances and deodorants for example, could also be added to the mixture. However, use of loose filler fiber and particulates, such as inorganic particulate for example, in the absorbent substrate is preferably avoided, as such fillers could shred during use of the sheet and contact food being prepared and limit absorbency. Use of fillers in the polymer particles themselves should not present this problem, however. In addition to production by hand, a continuous band press could be utilized to densify the sheet material.

In addition, the finished sheet can receive additional types of treatment after being formed. For instance, the sheet could be embossed or printed with a design to make the sheet more visually appealing. Also, the sheet may be combined with additional materials to improve shred resistance, if desired, and cut to the desired size and shape.

ADDITIONAL EXAMPLES

The following numbered samples describe exemplary sheet materials. In particular, samples 1–3 and 5–6 describe inventive absorbent sheet materials having cut-resistant particles. All examples use 0.75% by dry paper weight of Kymene 557LX, a wet strength agent manufactured by Hercules, Inc.

SAMPLE 1

Southern softwood kraft (SSK) and eucalyptus (Euc) drylap are defribillated in water to produce a slurry. The paper fiber is blended in a ratio of about 75% SSK to 25% Euc. PETG 6763 (from Eastman Chemical) particles, cryogenically ground on an attrition mill to an average particle size of approximately 300 microns, are added to the slurry. The particles are added at about 30% by weight of the total mass (paper+particles). The mixture is then run on a Fourdrinier-type linerboard machine to produce rolls of undensified paper with basis weight of about 320 lb/3000 ft$^2$. The paper is subsequently cut into sheets and subjected to a densification process to improve the cut resistance and shred resistance of the base paper. During this densification process, the sheets are pressed in a hot platen press at 380° F. and 440 psi for 25 seconds.

SAMPLE 2

SSK drylap is defibrillated in water to produce slurry A. SSK and eucalyptus drylap are defribillated in water to produce slurry B. The paper fiber of slurry B is blended in a ratio of about 75% SSK to 25% Euc. PETG 6763 particles (from Eastman Chemical), cryogenically ground on an attrition mill to an average particle size of approximately 300 microns, are added to slurry B. The particulate material is added at about 38% by weight of the total mass (paper+particulate) in slurry B. A three-ply product is produced with the top and bottom layer produced from slurry A and the middle layer produced from the particulate loaded slurry B. Rolls of undensified three-ply paper are produced with a total basis weight of about 320 lb/3000 ft$^2$, where the top and bottom layers each have a basis weight of about 35 lb/3000 ft$^2$. The overall polymer concentration of the sheet is about 30% (by weight). The paper is subsequently cut into sheets and subjected to a densification process to improve the cut resistance and shred resistance of the base paper, wherein the sheets are pressed in a hot platen press at 380° F. and 440 psi for 25 seconds.

SAMPLE 3

SSK and eucalyptus drylap are defribillated in water to produce a slurry. The paper fiber is blended in a ratio of about 75 % SSK to 25% Euc. PETG 6763 particles (from Eastman Chemical), cryogenically ground on an attrition mill to an average particle size of approximately 220 microns, are added to the slurry. The particulate material is added at about 30% by weight of the total mass (paper+particulate). The mixture is then run on a Fourdrinier-type linerboard machine to produce rolls of undensified paper with basis weight of about 320 lb/3000 ft$^2$. During a subsequent densification process, the sheets are pressed in a hot platen press at about 380° F. and 440 psi for about 25 seconds.

SAMPLE 4—(Control Sample)

Southern softwood kraft (SSK) and eucalyptus drylap are defribillated in water to produce a slurry. The paper fiber is blended in a ratio of about 75% SSK to 25% Euc. The mixture is then run on a Fourdrinier-type linerboard machine produce rolls of undensified paper with basis weight of about 320 lb/3000 ft$^2$. The paper is subsequently cut into sheets and subjected to a densification process, wherein the sheets are pressed in a hot platen press at about 380° F. and 440 psi for about 25 seconds

SAMPLE 5

Southern softwood kraft (SSK) and eucalyptus drylap are defribillated in water to produce a slurry. The paper fiber is blended in a ratio of about 75% SSK to Euc. PETG 6763 particles (from Eastman Chemical), cryogenically ground on an attrition mill to an average particle size of approximately 300 microns, are added to the slurry. The particulate material is added at about 30% by weight of the total mass (paper+particulate). The mixture is then run on a Fourdrinier-type linerboard machine to produce rolls of undensified paper with basis weight of 200 lb/3000 ft$^2$. The paper is subsequently cut into sheets and subjected to a densification process to improve the cut resistance and shred resistance of the base paper. The sheets are pressed in a hot platen press at 380° F. and 440 psi for 25 seconds.

SAMPLE 6

SSK and eucalyptus drylap are defribillated in water to produce a slurry. The paper fiber is blended in a ratio of about 75% SSK to 25% Euc. PETG 6763 particles (from Eastman Chemical), cryogenically ground on an attrition mill to an average particle size of approximately 200 microns, are added to the slurry. The particulate material is added at about 30% by weight of the total mass (paper+particulate). The mixture is then run on a Fourdrinier-type linerboard machine to produce rolls of paper with basis weight of about 165 lb/3000 ft$^2$. The undensified paper is then cut into sheets and subjected to a densification process to improve the cut resistance and shred resistance of the base paper. The sheets are pressed in a hot platen press at about 380° F. and 220 psi for about 25 seconds.

TEST METHODS

The following test methods are utilized for characterizing SAMPLES 1–6:

Absorbency Rate

1) A 36 in$^2$ (6 in. by 6 in.) (232.26 cm$^2$) sample is weighed and placed directly under a Buret.
2) 10 cc of distilled water is dispensed from the Buret onto the sample.
3) The water is permitted to absorb for 30 seconds. (If all water is absorbed prior to 30 seconds, record the time of absorption for later calculations.)
4) At 30 seconds, the sample is tapped 10 times on its side, removing any non absorbed water.
5) Weigh the sample and record the weight.
6) Calculate the absorbency rate as (final weight—initial weight)/time. The units are $$\frac{g_{water}}{s}.$$

7) Calculate the unit absorbency rate as ((final weight—initial weight)/time)/ sample area. The units are $$\frac{g_{water}}{s \cdot cm^2}.$$

8) Test 3–5 samples per above.
9) Report average of sample values.

Absorbent Capacity

1) A 16 in$^2$ (4 in. by 4 in.) (103.22 cm$^2$) sample is weighed and placed into a container of distilled water, completely submerged.
2) The sample remains completely submerged for 120 seconds.
3) At 120 seconds, the sample is removed from the water and permitted to drip dry for 30 seconds.
4) At the completion of the 30 second drip dry, the sample is shaken 1 time to remove residual water.
5) Weigh the sample and record the weight.
6) Calculate the capacity as (final weight—initial weight)/ sample area. The units are $$\frac{g_{water}}{cm^2}.$$

7) Test 3–5 samples per above.
8) Report average of sample values.

Absorbent Efficiency

1) Calculate the absorbent efficiency as:

$$Efficiency = \frac{Capacity \cdot Rate}{thickness} * 10^4$$

Slice Testing (Slice or Cut Resistance)

The test apparatus described applies a known force in the z (vertical) direction on a knife blade to measure the cut resistance of a sample. A knife blade is placed in the knife holder. The knife blades used for all testing are Poultry Blades Code #88–0337 by Personna. The test sample is mounted to a sample platform. The knife blade is then brought into contact with the sample. A known load is applied to the knife blade in the vertical direction. The sample platform is then moved at a rate of 8 inches per second for 4 inches under the weight of the knife blade creating a slice. Consecutive slices of increasing load are made until the knife blade cuts through the sample. The knife force required to penetrate completely through the sample is recorded. Slice resistance is calculated as the slice force/sample thickness. Replicate test on 3–5 separate samples and report average values.

Shredding Tests (Abrasion Loss)

The following abrasion loss test methods are adapted from TAPPI standard T476om-97 and utilized to characterize the shredding resistance of SAMPLES 1–6 described above.

Taber Abrasion Loss Test (dry)

1. Cut 4 inch×4 inch square sample with a ¼inch hole in the center.
2. Mount Catalog No. H-18 TABER® abrasion wheels on TABER® abraser tester. Mount 1000 g weights on parallel arms of TABER® tester.
3. Weigh sample to three decimal points.
4. Mount sample in specimen holder of TABER® tester. Lower the arms and start the turntable. Allow rotation for 100 revolutions at a rotation speed of approximately 70–75 RPM.
5. Remove the sample. Tap the sample on its side to remove any loose fibers on the surface. Weigh the sample to three decimal points.
6. Calculate the unit abrasion loss as (initial weight—final weight). The units are mg$_{material\ lost}$/100 revolutions.
7. Test three—five samples per above.
8. Report average of sample values.

Taber Abrasion Loss Test (wet)

1. Cut 4 inch×4 inch square sample with a ¼inch hole in the center.
2. Mount Catalog No. H-18 TABER® abrasion wheels on TABER® abraser tester. Mount 1000 g weights on parallel arms of taber tester.
3. Weigh sample to three decimal points.
4. Soak sample in distilled water for thirty seconds.
5. At 30 seconds, the sample is removed from the water and tapped ten times on its side in order to remove any non-absorbed water.
6. Mount sample in TABER® tester. Lower the arms and start the turntable. Allow rotation for 100 revolutions.
7. Remove the sample. Place sample in 140° F. oven to dry overnight. The samples are removed the next day and allowed to condition in the original environment for at least four hours.
8. Weigh the conditioned sample to three decimal points.
9. Calculate the unit abrasion loss as (initial weight—final weight). The units are mg$_{material\ lost}$/100 revolutions.
10. Test three—five samples per above.
11. Report average of sample values.

Figure 15:
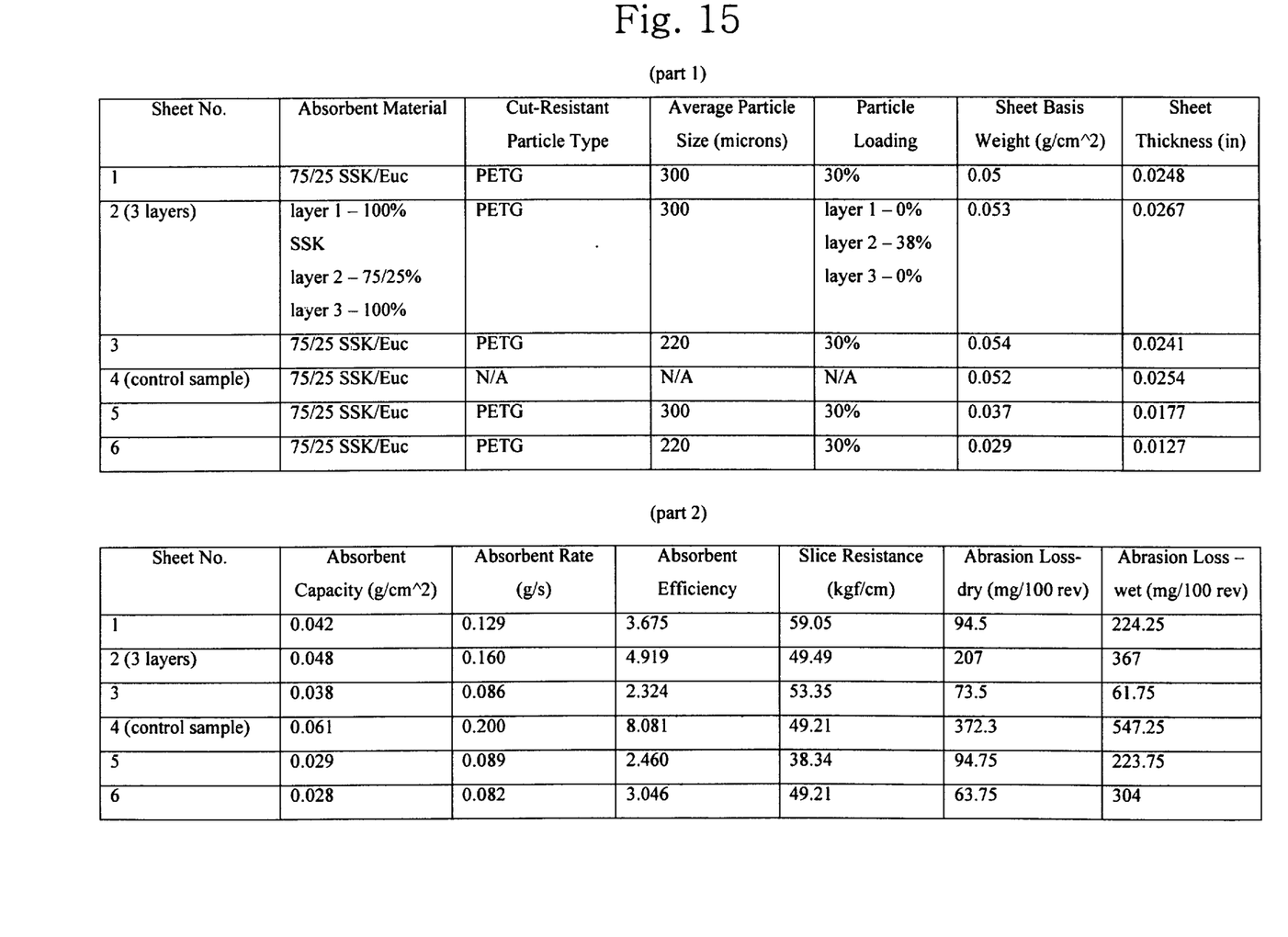
FIG. 15 is a data table illustrating preferred properties of sheet materials made in accordance with principles of the present invention.

Sheet materials having cut-resistant particles and made in accordance with the present invention exhibit high absorbency, high cut-resistance, and low abrasion loss. The absorbent efficiency, slice resistance, and abrasion loss for SAMPLES 1–6 are indicated in the table of FIG. 15. As illustrated in FIG. 15, sheet materials made according to principles of the present invention preferably exhibit an absorbent efficiency of at least about 0.2 and a slice resistance of at least about 30 kgf/cm. It is preferred that the inventive sheet materials exhibit an absorbent efficiency of at least about 0.2 and that the cutting surface of the sheet materials exhibit a wet abrasion loss of less than about 400 mg per 100 revolutions, and more preferably less than about 300 mg per 100 revolutions. It is also preferred that the sheet materials of the present invention exhibit an absorbent efficiency of at least about 0.2, a slice resistance of at least about 30 kgf/cm, and a wet abrasion loss of less than about 400 mg/100 revolutions. Even more preferably, the sheet materials of the present invention exhibit an absorbent efficiency of at least 1.0, a slice resistance of at least 40 kgf/cm, and a wet abrasion loss of less than about 400 mg per 100 revolutions. The cutting surface of such a material also preferably exhibits a dry abrasion loss of less than about 300 mg per 100 revolutions and more preferably less than about 200 mg per 100 revolutions.

As also shown in the examples of FIG. 15, it is preferred that the absorbent material within the sheet is provided in amounts of at least 50 percent by weight, in order to provide good absorbency, and that the cut-resistant particles are provided in an amount of between about 10 percent and about 50 percent by weight of the sheet. The sheet material also preferably has a relatively high basis weight. For example, weights of at least 100 pounds per 3000 ft$^2$ (0.016 g/cm$^2$) are preferred to provide adequate cut-resistance and absorbency. More preferably, the basis weight of the sheet material is at least 165 pounds per 3000 ft$^2$ (0.027 g/cm$^2$) and most preferably the basis weight of the sheet material is at least 300 pounds per 3000 ft$^2$ (0.049 g/cm$^2$). Also, the sheet material preferably has a thickness t of between about 250 microns (0.01 inch) and about 1250 microns (0.05 inch) to provide adequate cut-resistance and absorbency. The particles in the inventive sheet material preferably comprise a polymeric material, and preferably have an average size of at least about 100 micrometers (microns), and most preferably between 200 micrometers and 500 micrometers.

The foregoing examples and descriptions of the preferred embodiments of the invention have been presented for purposes of illustration and description only. They are not intended to be exhaustive or to limit the invention to the precise forms disclosed, and modifications and variations are possible and contemplated in light of the above teachings. While a number of preferred and alternate embodiments, systems, configurations, methods, and potential applications have been described, it should be understood that many variations and alternatives could be utilized without departing from the scope of the invention.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Accordingly, it is intended that such modifications fall within the scope of the invention as defined by the claims appended hereto.

What is claimed is:

1. An absorbent, cut-resistant, and shred-resistant sheet material, comprising:
   an absorbent substrate;
   cut-resistant particles dispersed through the absorbent substrate, wherein the sheet exhibits a cut resistance of at least 30 kgf/cm, an absorbent efficiency of at least 0.2, and a wet abrasion loss of less than 400 mg per 100 revolutions; and,
   wherein the sheet material has a basis weight of at least 100 pounds per 3000 ft$^2$.

2. The sheet material as recited in claim 1, wherein the cut-resistant particles have an average size of at least 100 micrometers.

3. The sheet material as recited in claim 1, wherein the absorbent substrate comprises absorbent material in an amount of at least 50 percent by weight of the sheet material.

4. The sheet material as recited in claim 1, wherein the cut resistant particles comprise a polymeric material.

5. The sheet material as recited in claim 1, wherein the sheet material has a basis weight of at least 165 pounds per 3000 ft$^2$.

6. The sheet material as recited in claim 1, wherein the sheet exhibits a dry abrasion loss of less than 300 mg per 100 revolutions.

7. The sheet material as recited in claim 1, further comprising:
   a cover layer and a backing layer provided on opposing surfaces of the absorbent substrate.

8. The sheet material as recited in claim 7, wherein the cover layer and backing layer comprise paper material and are substantially free of polymer particles.

9. The sheet material as recited in claim 7, wherein the cover layer and backing layer each have a basis weight of less than 100 pounds per 3000 ft$^2$, and wherein the absorbent substrate with dispersed particles has a basis weight of at least 100 pounds per 3000 ft$^2$.

10. The sheet material as recited in claim 1, wherein the sheet material is substantially free of inorganic free filler particulate.

11. A cut-resistant, shred-resistant, and absorbent sheet material, consisting essentially of: at least 50 percent by weight of an absorbent material, a plurality of non-fibrous cut resistant particles distributed throughout the absorbent material, wherein the particles have an average size of at least 100 micrometers, wherein the sheet material has a basis weight of at least 100 pounds per 3000 ft$^2$", and wherein the sheet material exhibits a cut resistance of at least 30 kgf/cm, and a wet abrasion loss of less than 400 mg per 100 revolutions."

12. The sheet material as recited in claim 11, wherein the particles are provided in an amount of up to 50 percent by weight of the sheet.

13. The sheet material as recited in claim 11, wherein the sheet material has a basis weight of at least 165 pounds per 3000 ft$^2$.

14. The sheet material as recited in claim 11, wherein the particles comprise a compounded polymeric material having up to 80 percent of inorganic filler by weight.

15. The sheet material as recited in claim 11, wherein the absorbent material comprises cellulosic material.

16. A cut-resistant, shred-resistant, and absorbent sheet material, comprising: an absorbent substrate having at least 50 percent by weight of an absorbent material; and a plurality of non-fibrous, cut resistant particles in contact with the absorbent substrate, wherein the particles have an average size of at least 100 micrometers, wherein the-absorbent substrate is substantially free of inorganic free filler particulate, wherein the sheet material has a basis weight of at least 100 pounds per 3000 ft$^2$, and wherein the sheet material exhibits a cut resistance of at least 30 kgf/cm and an absorbent efficiency of at least 0.2.

17. The sheet material as recited in claim 16, wherein the particles are provided in an amount of up to 50 percent by weight of the sheet material.

18. The sheet material as recited in claim 16, wherein the sheet material has a basis weight of at least 165 pounds per 3000 ft².

19. The sheet material as recited in claim 16, wherein the absorbent material comprises cellulosic material.

20. The sheet material as recited in claim 16, wherein the particles are at least partially bonded to the absorbent substrate.

21. The sheet material as recited in claim 16, further comprising:

a liquid impervious backing layer attached to the absorbent substrate.

22. The sheet material as recited in claim 1, wherein the sheet material is substantially free of polymer fibers.

23. The sheet material as recited in claim 16, wherein the cut resistant particles comprise polymeric particles having an average size of between 100 micrometers and 1000 micrometers.

24. The sheet material as recited in claim 23, wherein the polymeric material comprises a compounded polymeric material including inorganic filler material.

25. The sheet material as recited in claim 16, wherein the particles are distributed through the absorbent substrate.

26. The sheet material as recited in claim 25, wherein the particles are distributed in a gradient through the thickness of the absorbent substrate.

27. The sheet material as recited in claim 16, further comprising:

a top layer and a bottom layer provided on opposing sides of the absorbent substrate.

28. The sheet material as recited in claim 27, wherein the top layer and bottom layer each comprise paper materials.

29. The sheet material as recited in claim 27, wherein the top layer and bottom layer are substantially free of cut-resistant particles.

30. A method for forming a cut-resistant, absorbent, and shred-resistant sheet material, the method comprising the steps of: forming a mixture of absorbent fibers, polymeric particles, and water, wherein the polymeric particles have an average size of at least 100 micrometers; forming the mixture into a sheet; and applying heat and pressure to the sheet to cause the polymeric particles to at least partially bond to the cellulose fibers, wherein the sheet material exhibits a cut-resistance of at least 30 kgf/cm, an absorbent efficiency of at least 0.2, and a wet abrasion loss of less than 400 mg per 100 revolutions.

31. The method as recited in claim 30, wherein the particles are provided in an amount of up to about 50 percent by weight and wherein the absorbent fibers are provided in an amount of at least 50 percent by weight.

32. The method as recited in claim 30, wherein the sheet is formed to a thickness of between about 0.01 inches and about 0.05 inches.

33. The method as recited in claim 30, further comprising:

applying a thin cover layer to at least one side of the sheet, wherein the thin cover layer is substantially free of polymer particles and has a basis weight of less than about 100 pounds per 3000 ft².

34. A method of forming a cut-resistant, shred-resistant, and absorbent sheet material, the method comprising the steps of: forming a mixture comprising absorbent fibers, non-fibrous polymeric particles, and water, wherein the polymeric particles have an average particle size of between about 100 and 1000 $\mu$, and wherein the mixture is substantially free of inorganic free filler particulate; forming the mixture into a sheet; and drying the sheet, wherein the dried sheet has a basis weight of at least 100 pounds per 3000 ft², and exhibits a cut-resistance of at least 30 kgf/cm, an absorbent efficiency of at least 0.2, and a wet abrasion loss of less than 400 mg per 100 revolutions.

35. The method as recited in claim 34, wherein the particles are provided in an amount of up to about 50 percent by weight.

36. The method as recited in claim 34, wherein the steps are conducted using a paper-making machine.

37. The method as recited in claim 34, further comprising:

applying heat and pressure to the sheet to cause the polymeric particles to at least partially bond to the absorbent material.

38. The method as recited in claim 34, further comprising:

applying a thin layer to at least one side of the sheet, wherein the thin layer has a basis weight of less than about 100 pounds per 3000 ft² and is substantially free of polymer particles.

* * * * *